(12) United States Patent
Taniuchi et al.

(10) Patent No.: US 11,942,597 B2
(45) Date of Patent: Mar. 26, 2024

(54) SOLID-STATE BATTERY AND SOLID-STATE BATTERY MODULE

(71) Applicant: HONDA MOTOR CO., LTD., Tokyo (JP)

(72) Inventors: Takuya Taniuchi, Saitama (JP); Masahiro Ohta, Saitama (JP)

(73) Assignee: HONDA MOTOR CO., LTD., Tokyo (JP)

(*) Notice: Subject to any disclaimer, the term of this patent is extended or adjusted under 35 U.S.C. 154(b) by 759 days.

(21) Appl. No.: 17/041,431

(22) PCT Filed: Feb. 27, 2019

(86) PCT No.: PCT/JP2019/007696
§ 371 (c)(1),
(2) Date: Sep. 24, 2020

(87) PCT Pub. No.: WO2019/187940
PCT Pub. Date: Oct. 3, 2019

(65) Prior Publication Data
US 2021/0119250 A1 Apr. 22, 2021

(30) Foreign Application Priority Data
Mar. 28, 2018 (JP) ................. 2018-061759

(51) Int. Cl.
*H01M 10/0562* (2010.01)
*H01M 10/0525* (2010.01)
(Continued)

(52) U.S. Cl.
CPC ... *H01M 10/0562* (2013.01); *H01M 10/0525* (2013.01); *H01M 10/0585* (2013.01);
(Continued)

(58) Field of Classification Search
None
See application file for complete search history.

(56) References Cited

U.S. PATENT DOCUMENTS

2006/0216582 A1 9/2006 Lee et al.
2010/0047685 A1 2/2010 Lee et al.
(Continued)

FOREIGN PATENT DOCUMENTS

EP   3249740 A1 * 11/2017 ............. H01G 11/10
JP   2000106154 A    4/2000
(Continued)

OTHER PUBLICATIONS

Machine translation of JP 2010-033882 A (Year: 2010).*

*Primary Examiner* — Robert S Carrico
(74) *Attorney, Agent, or Firm* — CKC & Partners Co., LLC

(57) ABSTRACT

Provided are: a solid-state battery in which an initial load is applied to a battery cell; and a solid-state battery module comprised of the battery. This solid-state battery includes a pressing portion provided on a solid-state battery case so that a spring force is utilized to apply the initial load to the solid-state battery.
Specifically, the solid-state battery includes a solid-state battery cell, and a battery case for accommodating the solid-state battery cell, in which the solid-state battery cell is a stack including a positive electrode, a negative electrode, and a solid electrolyte present between the positive electrode and the negative electrode, and in which a face constituting the battery case and extending substantially perpendicular to the stacking direction of the stack has a pressing portion.

14 Claims, 6 Drawing Sheets

(51) Int. Cl.
*H01M 10/0585* (2010.01)
*H01M 10/613* (2014.01)
*H01M 10/625* (2014.01)
*H01M 10/653* (2014.01)
*H01M 10/6551* (2014.01)
*H01M 10/6561* (2014.01)
*H01M 10/6567* (2014.01)
*H01M 10/657* (2014.01)
*H01M 50/103* (2021.01)
*H01M 50/119* (2021.01)
*H01M 50/204* (2021.01)
*H01M 50/209* (2021.01)
*H01M 50/271* (2021.01)
*H01M 50/474* (2021.01)

(52) U.S. Cl.
CPC ....... *H01M 10/613* (2015.04); *H01M 10/625* (2015.04); *H01M 10/653* (2015.04); *H01M 10/6551* (2015.04); *H01M 10/6561* (2015.04); *H01M 10/6567* (2015.04); *H01M 10/657* (2015.04); *H01M 50/103* (2021.01); *H01M 50/119* (2021.01); *H01M 50/209* (2021.01); *H01M 50/474* (2021.01); *H01M 50/204* (2021.01); *H01M 50/271* (2021.01)

(56) References Cited

U.S. PATENT DOCUMENTS

2011/0250485 A1   10/2011   Tsukuda
2011/0274955 A1*  11/2011   Park .................. H01M 50/105
                                                        429/94

FOREIGN PATENT DOCUMENTS

| JP | 2003077426 A | 3/2003 |
| JP | 2006278327 A | 10/2006 |
| JP | 2010501981 A | 1/2010 |
| JP | 2010033882 A | 2/2010 |
| JP | 2011238504 A | 11/2011 |

* cited by examiner (a)

SOLID-STATE BATTERY AND SOLID-STATE BATTERY MODULE

This application is based on and claims the benefit of priority from Japanese Patent Application No. 2018-061759, filed on 28 Mar. 2018, the content of which is incorporated herein by reference.

TECHNICAL FIELD

The present invention relates to a solid-state battery and a solid-state battery module.
Furthermore, the present invention relates to a solid-state battery which applies an initial load to a battery cell, and which, when assembled into a module, exhibits a high energy density and a significant cooling effect, and to a battery module comprised of the solid-state battery.

BACKGROUND ART

Conventionally, lithium ion secondary batteries are widely used as secondary batteries with high energy density. Such a lithium ion secondary battery includes a structure in which a separator is disposed between a positive electrode and a negative electrode, and the space between the positive electrode and the negative electrode is filled with a liquid electrolyte (electrolyte solution).

Since the electrolyte solution of the lithium ion secondary battery is usually a flammable organic solvent, the safety to heat, in particular, becomes a problem in some cases. Therefore, a solid-state battery employing an inorganic solid electrolyte instead of the organic liquid electrolyte has been proposed (see Patent Document 1).
Solid-state batteries employing the solid electrolyte eliminates the problem arising from heat, and additionally allows for an increase in capacity and/or voltage by stacking, and further can meet the demand for compactness, as compared with the batteries employing the electrolyte solution.

Examples of the shape of such a secondary battery include a cylindrical shape, a rectangular shape, and the like.
Then, a secondary battery module is constructed when the secondary battery is used for devices requiring a large current and a large voltage, e.g. motor drives for hybrid electric vehicles, and the like.

The secondary battery module includes a plurality of secondary batteries connected in series, and includes a battery case which includes a space for accommodating the plurality of secondary batteries and electrode connection portions, and a module component coupled to the battery case (see Patent Document 2).

A more specific secondary battery module has, for example, a configuration in which a battery cell 202 and a separator 216 are alternately stacked and the stack is fixed using end plates 217 and binding bars 214 provided at both ends of the stack, as shown in FIG. 4(a), which is a cross-sectional view of the battery module 200 taken along the stacking direction of the battery, and in FIG. 4(b), which is a sectional view of the battery module 200 taken along the line A-A'.

In the case of a lithium ion secondary battery including a liquid electrolyte, inserting a battery cell into a battery case, followed by introducing an electrolyte solution causes the battery cell to swell with the electrolyte solution. Further, by performing the initial charging and discharging, followed by aging, the battery cell expands in volume. As a result, the battery case and the battery cell are in close contact, and surface pressure is generated therebetween.

However, with regard to the solid-state battery including a solid electrolyte, since the volume expansion of the battery cell is small after insertion of the battery cell into the battery case, sufficient surface pressure applied to the battery according to the above method is not generated.
Thus, there are concerns that interfacial resistance increases to cause deterioration of input-output characteristics, and that a battery cell is less likely to be sufficiently retained within a battery case and hence the vibration resistance is impaired, leading to a reduction in durability.

Patent Document 1: Japanese Unexamined Patent Application, Publication No. 2000-106154
Patent Document 2: Japanese Unexamined Patent Application, Publication No. 2006-278327

DISCLOSURE OF THE INVENTION

Problems to be Solved by the Invention

The present invention has been made in view of the above background art, and an object thereof is to provide a solid-state battery which applies an initial load to a battery cell, and a solid-state battery module comprised of the battery.

Means for Solving the Problems

The present inventors have focused on the facts that unlike the lithium ion secondary battery including the liquid electrolyte, the volume expansion of the battery cell including a solid electrolyte is small after insertion of the battery cell into the battery case, and hence an insertion clearance remains between the battery case and the battery cell after aging of the solid-state battery, leading to insufficient application of surface pressure.
Then, the present inventors have found that when a pressing portion is provided on a solid-state battery case to utilize a spring force, an initial load can be applied to the battery cell, to thereby complete the present invention.

Specifically, an aspect of the present invention relates to a solid-state battery, including a solid-state battery cell, and a battery case for accommodating the solid-state battery cell, in which the solid-state battery cell is a stack including a positive electrode, a negative electrode, and a solid electrolyte present between the positive electrode and the negative electrode, and in which a face constituting the battery case and extending substantially perpendicular to the stacking direction of the stack has a pressing portion that applies surface pressure to the solid-state battery cell.

The pressing portion may be provided only on one face of the battery case.
The pressing portion may be provided on a set of opposing faces of the battery case.
A heat sink may be disposed in the pressing portion.
The heat sink may be a fin or an uneven structure.
The battery case may be made of metal.
The solid-state battery may include an expansion material between the solid-state battery cell and the battery case, and the expansion material may expand in volume by water absorption or a chemical reaction, or change in volume by heat.

Another aspect of the present invention relates to a solid-state battery module including a plurality of the solid-state batteries described above, and a module component, in which the plurality of solid-state batteries are arranged so as to be substantially parallel to a predetermined direction, and a gap is formed between the adjacent solid-state batteries by the pressing portion.

At least one selected from the group consisting of air, water, a heat transfer material, a heater and the like for controlling the cell temperature, and an electrically insulating material or an electrically conductive material for making the module function, a cushioning material and a battery case fixing member and the like may be present in the gap.

The outer dimension of the battery case is substantially identical to the outer dimension of the solid-state battery cell, and the battery case has a recess, and the module component may be disposed in the recess.

The module component may be at least one selected from the group consisting of a bus bar, a thermistor, a harness, a voltage detection line, a battery case fixing member, and a cell voltage and temperature monitoring unit.

The solid-state battery cell may include a positive electrode tab connected to the positive electrode, and a negative electrode tab connected to the negative electrode, and the battery case may have at least one convex portion, and the positive electrode tab and the negative electrode tab may be housed in the convex portion.

The battery case may have at least two convex portions, and the positive electrode tab and the negative electrode tab may be each housed in a different convex portion.

The convex portion for housing the positive electrode tab and the convex portion for housing the negative electrode tab may be provided on the same face in the battery case.

The convex portion for housing the positive electrode tab and the convex portion for housing the negative electrode tab way be provided on different faces in the battery case.

Another aspect of the present invention relates to an apparatus including the solid-state battery module described above.

Effects of the Invention

A solid-state battery according to an aspect of the present invention includes a pressing portion that utilizes a spring force, and therefore the solid-state battery can apply an initial load to a battery cell, resulting in an improvement in input-output characteristics.

Moreover, in a solid-state battery module including the solid-state batteries arranged so as to be substantially parallel to a predetermined direction, a gap can be formed between adjacent solid-state batteries by the pressing portion, and therefore a solid-state battery module exhibiting a significant cooling effect can be formed.

Further, when the pressing portion is disposed in the solid-state battery module so as to be substantially parallel to the predetermined direction, surface pressure can be applied to the entire module. This allows for omission of a separator between adjacent batteries and omission of end plates at both ends of the module.

As a result, the volume of the entire module can be reduced, and the energy density of the battery module can be improved.

PREFERRED MODE FOR CARRYING OUT THE INVENTION

Hereinafter, embodiments of the present invention will be described with reference to the accompanying drawings. However, the embodiments described below merely illustrate the present invention, and the present invention is not limited to the following.

Solid-State Battery

The solid-state battery according to the present invention includes a solid-state battery cell and a battery case for accommodating the solid-state battery cell, and is characterized in that the solid-state battery is a stack including a positive electrode, a negative electrode, and a solid electrolyte present between the positive electrode and the negative electrode, and that a face constituting the battery case and extending substantially perpendicular to the stacking direction of the stack has a pressing portion.
Hereinafter, each component will be described with reference to the drawings.

Figure 1:
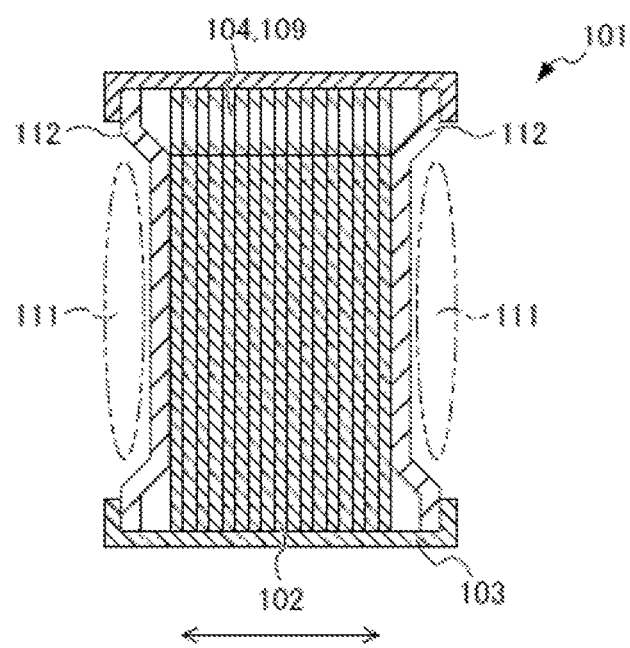
FIG. 1 is a cross-sectional view of a solid-state battery according to an embodiment of the present invention.
Figure 1:
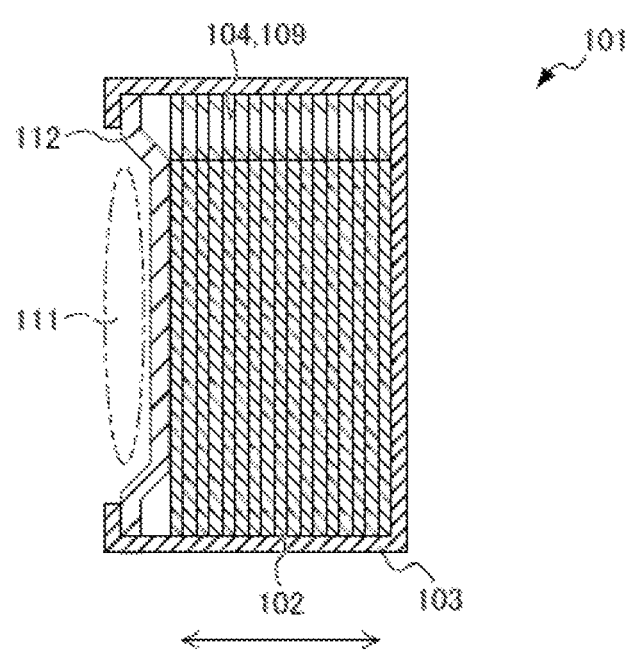

A solid-state battery according to an embodiment of the present invention is shown in FIG. 1.
The solid-state battery includes a battery cell 102 and a battery case for accommodating the battery cell 102, as shown in FIG. 1.
Further, the battery cell 102 has a pressing portion 112.

Battery Case

Pressing Portion

The pressing portion in the solid-state battery according to the embodiment of the present invention exerts the action of applying surface pressure to the solid-state battery cell by force of a spring.
Therefore, the pressing portion is provided in a face substantially perpendicular to the stacking direction of the stack of the positive electrode layer, the solid electrolyte layer, and the negative electrode layer in the solid-state battery cell (i.e., a face substantially parallel to the positive electrode layer, the solid electrolyte layer, and the negative electrode layer).
This allows for the application of surface pressure in the stacking direction of the stack of the positive electrode layer, the solid electrolyte layer, and the negative electrode layer, and for the application of an initial load to a single battery cell, thereby improving the input-output characteristics and the vibration resistance.

The pressing portion in the embodiment of the present invention may be provided only on one face of the battery case, or may be provided on a set of opposing faces.
In the case where the pressing portion is provided only on one face of the battery case, surface pressure will be applied in the stacking direction only from one side of the stack of the positive electrode layer, the solid electrolyte layer, and the negative electrode layer in the battery cell.

In the case where the pressing portion is provided on a set of opposing faces, the stack of the positive electrode layer, the solid electrolyte layer, and the negative electrode layer in the battery cell can be sandwiched, and surface pressure can be applied in the stacking direction from both sides.

In the present invention, the pressing portion is preferably provided on the set of opposing faces.

Figure 2:
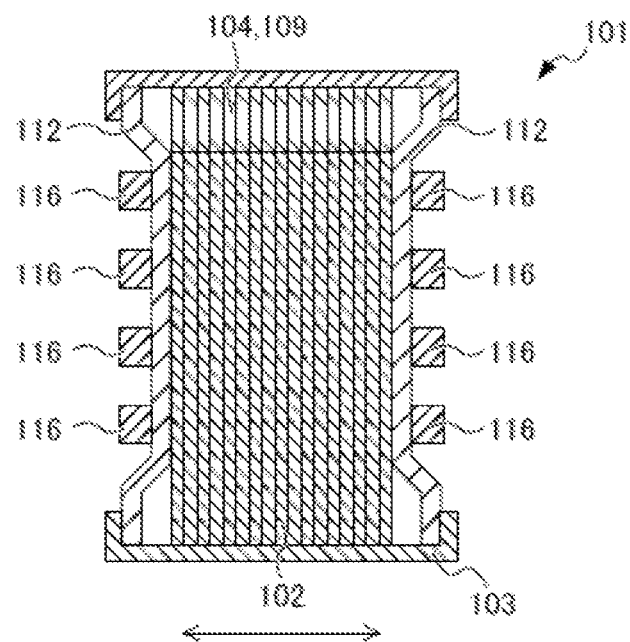
FIG. 2 is a cross-sectional view of a solid-state battery according to an embodiment of the present invention.

FIGS. 1 and 2 are cross-sectional views of an embodiment of the solid-state battery of the present invention.

In the battery cell 102 in the battery 101 shown in FIGS. 1 and 2, the pressing portion 112 is provided on the face substantially perpendicular to the stacking direction of the stack of the positive electrode layer, the solid electrolyte layer, and the negative electrode layer (shown by the left right arrow).

In the battery 101 shown in FIGS. 1(a) and 2, the pressing portions 112 are provided on a set of opposing faces.

In FIG. 1(b), the pressing portion 112 is provided only on one face of the battery case 103.

The structure of the pressing portion is not particularly limited, as long as it exerts the effect of applying surface pressure to the solid-state battery cell.

The structure of the pressing portion is exemplified by a stepped shape, a wavy shape, a shape formed of a curved surface, and the like.

In the battery 101 according to the embodiments shown in FIGS. 1 and 2, the stepped pressing portion 112 is provided.

Further, the pressing portion may form, in the battery case, a continuous structure with a portion other than the pressing portion or a discontinuous structure therewith.

By adopting the discontinuous structure, other forces can be applied together with the force by the spring.

In the battery 101 according to the embodiments of FIGS. 1 and 2, the stepped pressing portion 112 is formed discontinuously with the battery case 103.

The structure in which the pressing portion is slidable inwardly as in the present embodiment allows for easy application of surface pressure to the battery cell, for example, when the battery cell is pressed from both ends during the formation of the solid-state battery module.

Alternatively, when the internal pressure of the battery cell is increased, a stress can be released, leading to an improvement in safety.

Heat Sink

Further, it is preferable that the heat sink is disposed in the pressing portion of the battery case.

The heat sink increases the cooling area and allows for an increase in cooling efficiency, which also makes it possible to omit cooling means other than the heat sink, such as cooling water.

The configuration of the heat sink is not particularly limited, and its size is not particularly limited as long as it can be disposed.

In the case where the heat sink is disposed in the pressing portion, the heat sink is preferably a fin.

The fin is particularly preferred in terms of cooling efficiency because it can increase the surface area of the battery case.

Note that the material of the fin is not particularly limited as long as it has good thermal conductivity.

Also, the shape of the fin is not particularly limited.

FIG. 2 is an example showing an embodiment of the solid-state battery including the fin in the pressing portion.

As shown in FIG. 2, in the battery 101, the battery cell 102 is contained in the battery case 103 having a pressing portion 112, and a plurality of fins 116 are arranged in the pressing portion 112.

In the case where the heat sink is provided in the pressing portion, the heat sink may be an uneven structure formed by subjecting the battery case surface to embossing or the like.

In the case of the uneven structure formed by subjecting the battery case surface to embossing or the like, the uneven structure can impart a cooling effect while suppressing a decrease in volume energy density of the solid-state battery obtained.

When the heat sink is the uneven structure, the shape thereof is not particularly limited, but for example, the heat sink preferably has a wavy shape.

In the case of the wavy shape, it is possible to generate a spring pressure of high uniformity in the pressing portion. Examples of the wavy shape include triangular wave shapes, saw-wave shapes, rectangular wave shapes, sinus-wave shapes, and the like.

Materials

The material of the battery case is not particularly limited, but is preferably a metal.

When the material is a metal, the heat dissipation may be improved, and the sea lability of the battery case may be improved because of an improvement of the strength of the case itself as well as the weldability thereof.

Outer Dimension

In the battery case of the solid-state battery according to the embodiment of the present invention, the outer dimension of the battery case is preferably substantially identical to the outer dimension of the battery cell.

Generally, secondary batteries include a positive electrode, a negative electrode, an electrolyte present between the positive electrode and the negative electrode, a positive electrode tab connected to the positive electrode, and a negative electrode tab connected to the negative electrode.

Then, in conventional secondary batteries, a space is provided between the battery case and the battery cell for the purpose of housing a gas to be generated in the case of a liquid electrolyte and/or for the purpose of allowing a space necessary for introducing the electrolyte solution.

In other words, in the conventional batteries, there is a difference in outer dimension between the battery cell and the battery case, and the battery case has a residual space in which no battery cell resides.

This residual space reduces the energy density of the battery cell.

On the other hand, unlike a lithium ion secondary battery into which a liquid electrolyte is introduced, the solid-state battery does not require a space for storing a gas.

In addition, a space for introducing an electrolyte solution does not need to be provided.

After the insertion of the battery cell into the battery case, the amount of the gas to be generated in the battery cell is negligibly small, and therefore the battery case of the solid-state battery does not require the residual space.

Thus, the battery case constituting the solid-state battery according to the embodiment of the present invention preferably covers the battery cell conforming to the outer shape of the battery cell.

In the embodiment of the present invention, this makes it possible to reduce the volume of the solid-state battery, and consequently to improve the energy density of the solid-state battery and the degree of freedom in design of the battery shape.

In FIG. 5(b), which is a cross-sectional view of the solid-state battery module according to an embodiment of the present invention, the battery cell 102 is accommodated in the battery case 103, the battery case 103 covers the battery cell 102 conforming to the outer shape of the battery cell 102, and the outer dimension of the battery case 103 is substantially identical to the outer dimension of the battery cell 102.

Recess

As described above, in the case where the battery case of the solid-state battery according to the embodiment of the present invention covers the battery cell conforming to the outer shape of the battery cell, and the outer dimension of the battery case is substantially identical to the outer dimension of the solid-state battery cell, the portion corresponding to the residual space in the conventional battery will be present as a recess in the battery case.

In other words, in the case where the outer dimension of the battery case is substantially identical to the outer dimension of the solid-state battery cell, since the recess is a space which corresponds to the residual space in the conventional battery, the position where the recess is formed is not particularly limited in the battery case.

In any face of the battery case, the recess may be formed in a central portion of the face or in a peripheral portion thereof.

Further, not only one recess, but also more than one recess may be provided in the battery case.

In the case where the outer dimension of the battery case of the solid-state battery cell according to the embodiment of the present invention is substantially identical to the outer dimension of the battery cell, a module component is preferably arranged in the recess of the battery case in the formation of a battery module from the battery.

The arrangement of the module component in the recess makes it possible to reduce the volume of the entire battery module, and consequently to improve the energy density of the battery module.

Furthermore, since there is no residual space in the battery case, the displacement, peeling or the like of the battery cell due to vibration or the like can also be suppressed.

In FIG. 5(b), which is a cross-sectional view of the solid-state battery module according to the embodiment of the present invention, a thermistor 108, which is a module component, is disposed in the recess formed in the battery case 103.

Convex Portion

The battery case of the solid-state battery according to the embodiment of the present invention has at least one convex portion, and the positive electrode tab and the negative electrode tab are preferably housed in the convex portion(s).

As described above, in the case where the outer dimension of the battery case of the solid-state battery according to the embodiment of the present invention is substantially identical to the outer dimension of the solid-state battery cell, the portion corresponding to the residual space in the conventional battery is present as the recess in the battery case.

Therefore, in the battery cell, the positive electrode tab and the negative electrode tab extending from the end face of the stack of the positive electrode layer, the solid electrolyte layer, and the negative electrode layer will be housed in a portion other than the recess of the battery case.

Thus, in the present invention, it is preferable to use a battery case having a convex portion for housing the positive electrode tab and the negative electrode tab extending from the end face of the stack serving as a battery cell, and to house the positive electrode tab and the negative electrode tab in the convex portion.

This makes it possible to define the boundary between the convex portion and the recess formed in the portion corresponding to the residual space in the conventional battery, and to more densely pack the module component disposed in the recess.

As a result, the volume of the entire solid-state battery module can be reduced, and the energy density can be improved.

Further, it is preferable that the battery case of the solid-state battery according to the embodiment of the present invention has at least two convex portions, and that the positive electrode tab and the negative electrode tab are each housed in a different convex portion.

When the battery case of the solid-state battery constituting the solid-state battery module according to the embodiment of the present invention has at least two convex portions, the convex portion for housing the positive electrode tab, and the convex portion for housing the negative electrode tab may be provided on the same face in the battery case, or provided on different faces.

FIG. 5(b), which is a cross-sectional view of the battery module 100 according to an embodiment of the present invention taken along the line A-A', and FIGS. 1(a), 1(b) and 2, which are each a cross-sectional view of the solid-state battery according to the embodiment of the present invention, show the battery case 103 having two convex portions, one being for housing the positive electrode tab 104 and the other being for housing the negative electrode tab 109, and show an embodiment in which the convex portion for housing the positive electrode tab 104 and the convex portion for housing the negative electrode tab 109 are provided on the same face in the battery case 103.

Figure 6:
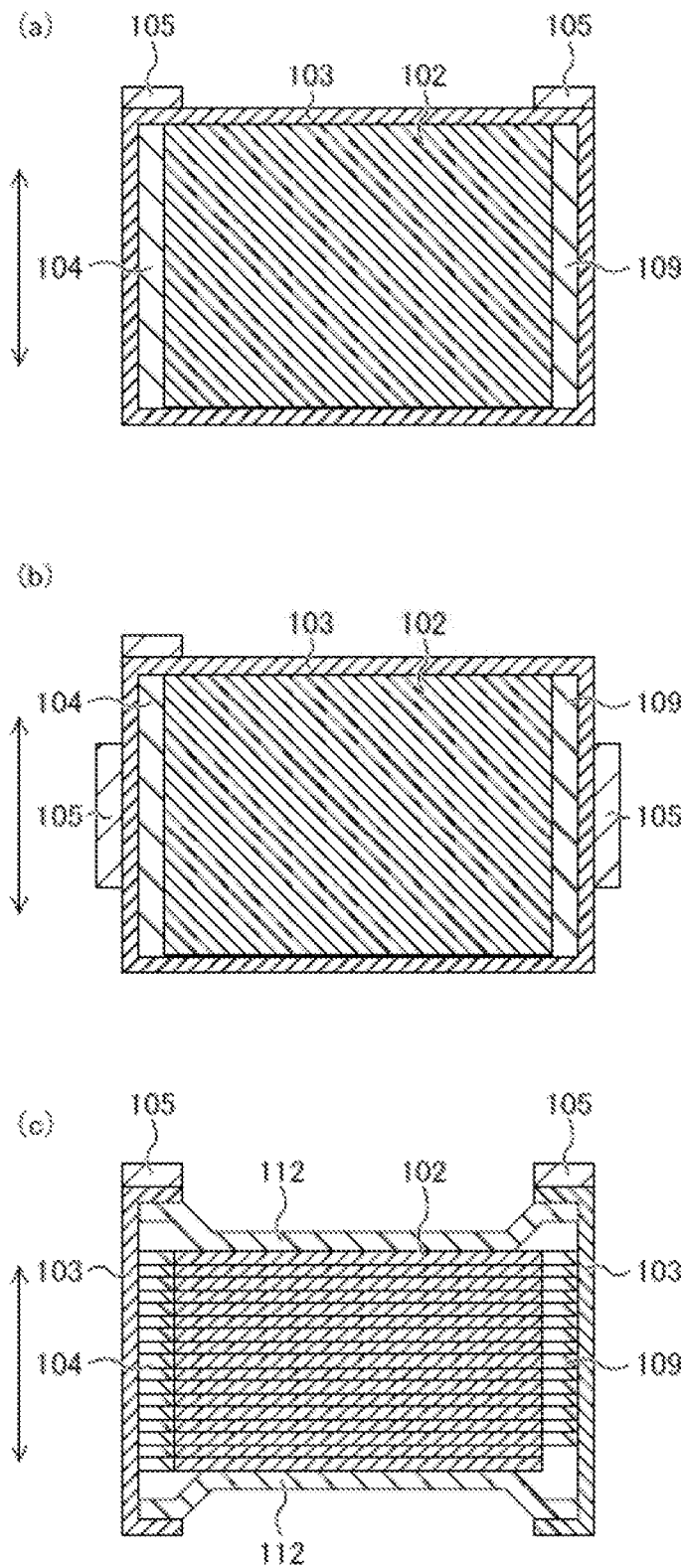
FIG. 6 is a cross-sectional view of a solid-state battery according to an embodiment of the present invention.

FIGS. 6(a) to 6(c) show yet other embodiments in which the convex portion for housing the positive electrode tab 104 and the convex portion for housing the negative electrode tab 109 are provided on different faces in the battery case 103.

Solid-State Battery Cell

The solid-state battery cell, like the conventional battery cell, includes the positive electrode, the negative electrode, and the solid electrolyte present between the positive electrode and the negative electrode.

The solid-state battery cell in the embodiment of the present, invention can function whether it is a stack of electrodes or a laminated cell.

A cross-sectional view of the solid-state battery cell which is an embodiment of the present invention is shown in FIG. 5(b).

The battery cell 102 shown in FIG. 5(b) has a positive electrode layer (not shown), a negative electrode layer (not shown), a solid electrolyte layer (not shown) present between the positive and negative electrode layers, a positive electrode tab 104 connected to the positive electrode layer, and a negative electrode tab 109 connected to the negative electrode layer.

Positive Electrode and Negative Electrode

The positive and negative electrodes constituting the solid-state battery according to the embodiment of the present invention are not particularly limited, as long as they are usable as a positive electrode or a negative electrode of the solid-state battery.

The positive electrode and the negative electrode each include an active material and a solid electrolyte, and may optionally include a conductivity aid, a binder, and the like.

The positive and negative electrodes constituting the solid-state battery according to the embodiment of the present invention may be prepared by selecting two types of materials from the materials capable of constituting an electrode, comparing the charge and discharge potentials of the two types of compounds, and assigning one exhibiting a higher potential to the positive electrode, and the other exhibiting a lower, potential to the negative electrode, and this process allows any battery to be configured.

Solid Electrolyte

The solid electrolyte constituting the solid-state battery according to the embodiment of the present invention includes a binder and the like, as needed.

In the embodiment of the present invention, the material of the solid electrolyte is not particularly limited as long as it is usable as a solid electrolyte of a solid-state battery.

For example, the solid electrolyte is exemplified by an oxide-based solid electrolyte and a sulfide-based solid electrolyte.

Note that the composition ratio of each substance contained in the solid electrolyte is not particularly limited as long as the battery can be appropriately operated.

Further, the thickness, shape and the like of the solid electrolyte are not particularly limited, as long as the solid electrolyte can be appropriately present between the positive electrode and the negative electrode, and ion conduction between the positive electrode and the negative electrode is possible.

Further, there is no particular limitation on the manufacturing method for the solid electrolyte.

Positive Electrode Tab/Negative Electrode Tab

The positive and negative electrode tabs are respectively connected to the current collecting foils of the positive electrode and the negative electrode, and serve as a current collector for the battery.

With regard to the positive and negative electrode tabs constituting the solid-state battery according to the embodiment of the present invention, the material, structure, and the like thereof are not particularly limited, as long as the tabs are a current collector used in the solid-state battery.

In the embodiment of the present invention, the material for the positive and negative electrode tabs is exemplified by a metal foil having a thickness of about 10 to 500 μm, or the like.

Tab Arrangement

In the solid-state battery constituting the solid-state battery module according to the embodiment of the present invention, the positive electrode tab and the negative electrode tab are respectively connected to the current collecting foils of the positive electrode layer and the negative electrode layer. Thus, in the battery cell, the positive and negative electrode tabs are provided so as to extend from the end faces of the stack of the positive electrode layer, the solid electrolyte layer, and the negative electrode layer.

Here, the arrangement of the tabs will be described with reference to the drawings.

FIG. 5(b) is a cross-sectional view of the battery module 100 according to the embodiment of the solid-state battery module of the present invention taken along the line A-A', and FIGS. 1(a) and 1(b) are each a cross-sectional view of a solid-state battery according to an embodiment of the present invention.

FIGS. 1(a) and 1(b) show cross-sections of the positive electrode tab 104 portion and the negative electrode tab 109 portion, respectively, taken along a direction parallel to the stacking direction (indicated by the left right arrow) of the stack of the positive electrode layer, the solid electrolyte layer, and the negative electrode layer, which constitute the battery cell 102, and FIG. 5(b) shows a cross-section taken along a direction perpendicular to the stacking direction.

As shown in FIGS. 1(a) and 1(b), the positive electrode tab 104 and the negative electrode tab 109 are respectively provided in connection with the current collecting foils of the positive electrode and the negative electrode so as to extend from the end faces of the stack of the positive electrode layer, the solid electrolyte layer, and the negative electrode layer, which constitute the battery cell 102.

In the embodiment shown in FIG. 5(b), the positive electrode tab 104 and the negative electrode tab 109 each extend from a different site at the same end face of the stack of the positive electrode layer, the solid electrolyte layer, and the negative electrode layer of the battery cell 102.

Then, in the embodiment shown in FIG. 5(b), the battery case 103 is provided with two convex portions, one being for housing the positive electrode tab 104 and the other being for housing the negative electrode tab 109, and the positive electrode tab 104 and the negative electrode tab 109 are each housed in the convex portion therefor.

In the present invention, the positive electrode tabs 104 and the negative electrode tabs 109 may be arranged so as to extend from the same end face of the stack of the positive electrode layer, the solid electrolyte layer, and the negative electrode layer, which constitute the battery cell, as shown in FIGS. 1(a) to 1(b), 2, and 5(b), or may be separately arranged so that the positive electrode tabs 104 and the negative electrode tabs 109 each extend from a different end face, as shown in FIGS. 6(a) to 6(c).

In the case where the positive electrode tab and the negative electrode tab are separately arranged on different faces, as shown in FIGS. 6(a) to 6(c), an increase in volume of the space formed in the vicinity of the tabs between the battery cell and the battery case can be suppressed even when the battery is oblong.

Expansion Material

As described above, with regard to the solid-state battery including the solid electrolyte, since the volume expansion of the battery cell is negligibly small after the insertion of the battery cell into the battery case, surface pressure due to the volume expansion of the battery cell is not generated, unlike the lithium ion secondary battery including the liquid electrolyte.

Thus, the solid-state battery according to the embodiment of the present invention is preferably provided with an expansion material between the solid-state battery cell and the battery case.

After the insertion of the battery cell into the battery case, the battery case can be brought into close contact with the battery cell by expanding the expansion material, to thereby apply surface pressure to the solid-state battery.

Figure 3:
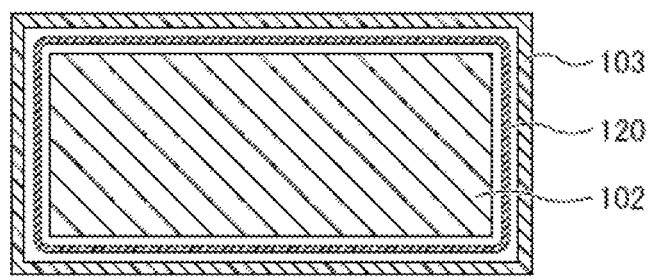
FIG. 3 is a cross-sectional view of a solid-state battery according to an embodiment of the present invention.
Figure 3:
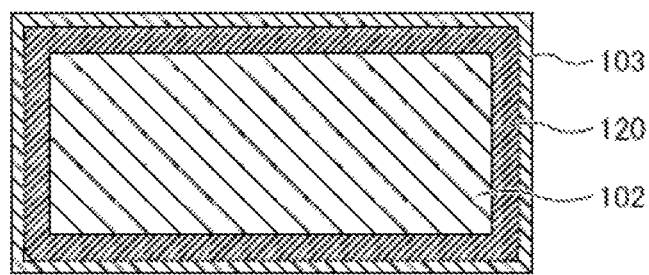

FIG. 3 is an example showing an embodiment of a solid-state battery including the expansion material between the solid-state battery ceil and the battery case.

As shown in FIG. 3(a), in the solid-state battery according to an embodiment of the present invention, the expansion material 120 is preferably disposed between the battery cell 102 and the battery case 103, and as shown in FIG. 3(b), the expansion material 120 is preferably expanded, and the battery cell 102 is brought into close contact with the battery case 103, to thereby apply surface pressure to the solid-state battery.

The expansion material is not particularly limited, but an expansion material which expands in volume by water absorption or a chemical reaction such as polymerization, or changes in volume by heat is preferred.

Assembly of batteries is usually carried out in a dry environment, but the incorporation of moisture on the order of ppm is unavoidable.

In the case where the expansion material that expands by water absorption is used, the expansion material absorbs the incorporated moisture and expands in volume, to thereby bring the battery case into close contact with the battery cell, and apply surface pressure to the solid-state battery, and additionally the moisture inside the solid-state battery can be brought close to 0% at the same time.

In particular, when a sulfide-based electrolyte is used, hydrogen sulfide may be generated due to the presence of moisture, and may deteriorate the battery cell.

Use of the expansion material which expands by water absorption can suppress the generation of hydrogen sulfide even when the sulfide-based electrolyte is used, and as a result, the deterioration of the solid-state battery can be suppressed.

Further, even when the sealing portion of the solid-state battery is deteriorated and the atmosphere enters, the expansion material allows for the suppression of the deterioration of the battery since the expansion material absorbs the moisture in the atmosphere flowing into the inside of the battery.

The material which expands in volume by water absorption is not particularly limited, and examples thereof include zeolites, silica gels, and the like.

In addition, in the case where a material which expands in volume by a chemical reaction such as polymerization is used as the expansion material, a polymerization initiator may be added in a polymerization composition, such that timing of the volume expansion can be adjusted and then the polymerization composition can be solidified.

Therefore, the volume expansion can be achieved at a timing when the application of surface pressure is desired.

The material which expands in volume by a chemical reaction such as polymerization is not particularly limited, and examples thereof include urethane foam and the like.

Further, in the case where those which change in volume by heat are used as an expansion material, surface pressure can be ensured by utilizing the difference in thermal expansion coefficient.

For example, the expansion material may be cooled to or below ambient temperature to cause contraction in volume of the expansion material, put into the battery case in its contraction state, and thereafter expanded by warming the expansion material to ambient temperature. This allows for close contact of the battery case with the battery cell, and for the application of surface pressure to the solid-state battery.

The material which changes in volume by heat is not particularly limited, and examples thereof include polypropylene, polyethylene terephthalate resins, and the like.

Solid-State Battery Module

The solid-state battery module according to an embodiment of the present invention includes a plurality of the solid-state batteries according to the embodiment of the present invention and a module component.

Battery Module of Conventional Structure

First, a description will be given of a battery module of a conventional structure.

Figure 4:
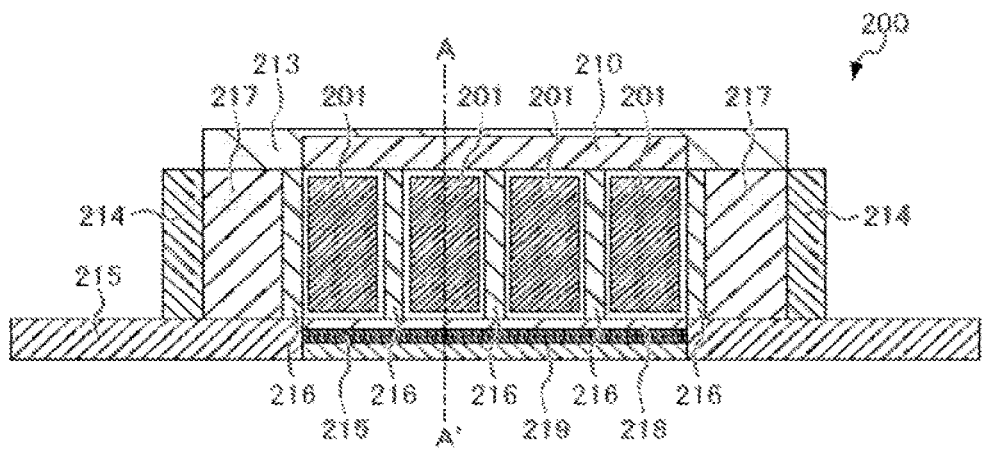
FIG. 4 is a side view and a sectional view taken along the line A-A' of a conventional secondary battery module.
Figure 4:
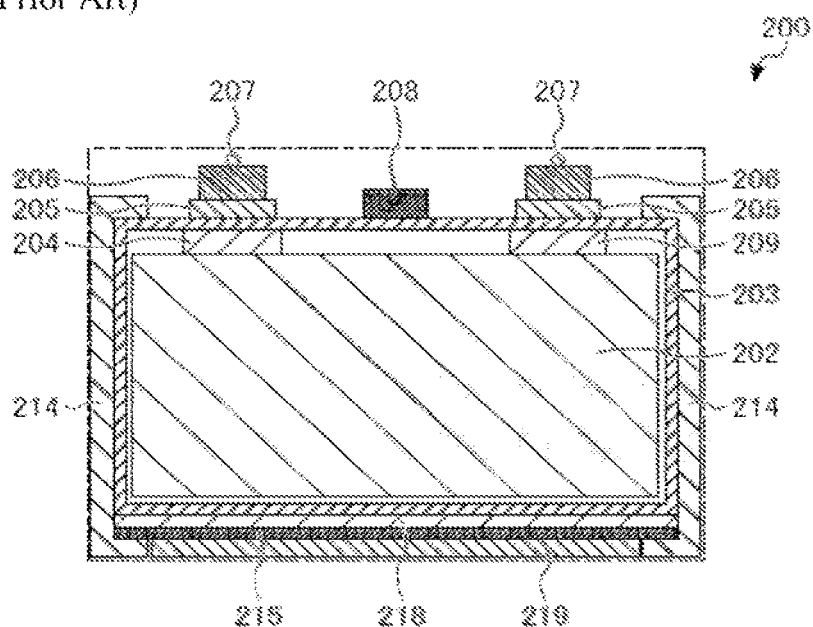

FIGS. 4(a) and 4(b) are each a diagram showing a battery module of a conventional structure.

FIG. 4(a) is a cross-sectional view of a battery module 200 taken along the stacking direction of the battery 201, and FIG. 4(b) is a cross-sectional view of the battery module 200 taken along the line A-A'.

In the conventional battery module 200, a plurality of batteries 201 are arranged so as to be substantially parallel to a predetermined direction, as shown in FIG. 4(a).

A separator 216 is disposed between the adjacent batteries 201 so that the separator 216 provides electrical isolation and applies an even pressure to the batteries 201 constituting the module.

End plates 217 and binding bars 214 are disposed at both ends of the stack of the batteries 201 and the separators 216. The end plates 217 apply surface pressure to the stack of the plurality of batteries 201 and the plurality of separators 216 to maintain their alignment, and the binding bars 214 enhance their binding.

As shown in FIG. 4(a), the upper face of the conventional battery module 200 is covered with a top cover 213 corresponding to a lid of the module, and the electrical insulation is retained by the top cover 213.

In addition, the stack of the batteries 201 and the separators 216 is fixed to a lower plate 215 by the binding bar 214, to maintain the shape of the stack.

Further, a thermally conductive material 218 such as a silicon compound and cooling water 219 are disposed on the bottom face of the battery module 200 (i.e., the surface on which the lower plate 215 resides) for the purpose of conducting heat from the stack of the batteries 201 and cooling the stack.

In the conventional battery module 200, a terminal 205, a bus bar 206, a voltage detection line 207, and a thermistor 208, which each correspond to the module component 210, as well as binding bars 214, a lower plate 215, a thermally conductive material 218, and cooling water 219 are disposed outside the battery case 203, with the module components being superposed on the positive electrode tab 204 and the negative electrode tab 209, as shown in FIGS. 4(a) and 4(b). Then, the battery module 200 is covered by the top cover 213 so as to house the superposed module components 210. Therefore, in the conventional battery module 200, the volume of the entire battery module 200 (i.e., the region indicated by the broken line) is larger than the volume of the battery case 203 which provides the outer shape of the battery 201, resulting in a low energy density of the module. Further, in some cases, electrode displacement or the like occurs in the conventional battery module 200 due to vibration or the like.

Solid-State Battery Module According to Embodiment of the Present; Invention

In contrast, the solid-state battery module according to the embodiment of the present invention is comprised of the solid-state battery according to the embodiment of the present invention, in which a plurality of the solid-state batteries are arranged so as to be substantially parallel to a predetermined direction.

Specifically, the solid-state battery module according to the embodiment of the present invention is formed by arranging solid-state batteries having, on the face of the battery case, a pressing portion for applying surface pressure to the solid-state battery cell, in which the face of the battery case extends substantially perpendicular to the stacking direction of the stack of the positive electrode, the solid electrolyte and the negative electrode.

FIGS. 5(a) and 5(b) are each a diagram showing an embodiment of the solid-state battery module of the present invention.

FIG. 5(a) is a cross-sectional view of the battery module 100 taken along the stacking direction of the plurality of batteries 101 (i.e., a direction perpendicular to the predetermined direction), and FIG. 5(b) is a cross-sectional view of the battery module 100 taken along the line A-A'.

The battery module 100 according to the embodiment of the present invention shown in FIGS. 5(a) and 5(b) includes a plurality of the solid-state batteries according to the embodiment of the present invention as shown in FIG. 1(a).

In the battery module 100, the plurality of batteries 101 are arranged so as to be substantially parallel to the predetermined direction, as shown in FIG. 5(a), and each battery 101 includes a battery cell 102 and a battery case 103 for accommodating the battery cell 102, as shown in FIG. 5(b), and the battery cell 102 has, like the conventional battery cell, a positive electrode (not shown), a negative electrode (not shown), a solid electrolyte (not shown) present between the positive electrode and the negative electrode, a positive electrode tab 104 connected to the positive electrode, and a negative electrode tab 109 connected to the negative electrode.

In the battery module 100, only the binding bars 114 are disposed at both ends of the stack of the batteries 101 to enhance binding of the stack.

Note that in the case of the battery module 100, an end plate is not disposed at either end of the plurality of batteries 101. However, in the case where the application of surface pressure to the stack of the batteries 101 is necessary, an end plate may be disposed as required.

As shown in FIG. 5(a), the upper face of the battery module 100, which is an embodiment of the present invention, is covered with a top cover 113 corresponding to the lid of the module, and the electrical insulation is retained by the top cover 113.

The stack of the batteries 101 is also secured to the lower plate 115 by a binding bar 214 to maintain its shape.

Arrangement Direction of Solid-State Battery (Predetermined Direction)

In the solid-state battery module according to the embodiment, of the present invention, the plurality of solid-state batteries are arranged so as to be substantially parallel to the predetermined direction, but the arrangement direction of the solid-state batteries is not particularly limited.

Note that in the solid-state battery module according to the embodiment of the present invention, the arrangement direction of the plurality of solid-state batteries (predetermined direction) is substantially perpendicular to the face direction of a face in which the positive electrode tab and the negative electrode tab are provided.

Figure 5:
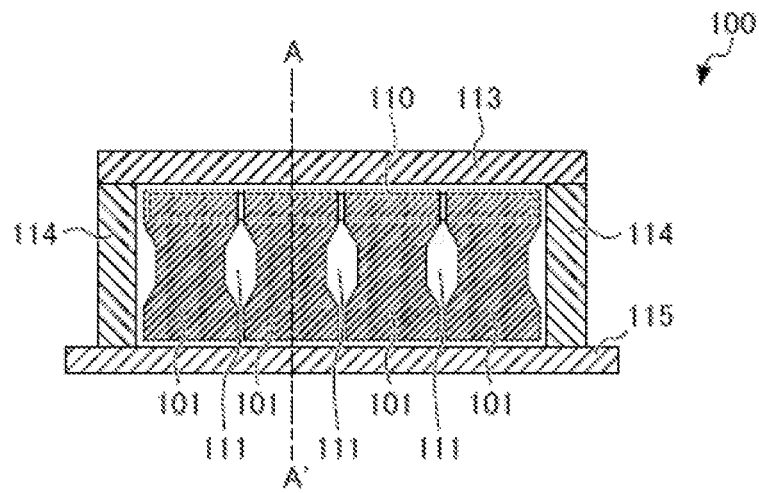
FIG. 5 is a side view and a sectional view taken along the line A-A' of a solid-state cell module according to an embodiment of the present invention.
Figure 5:
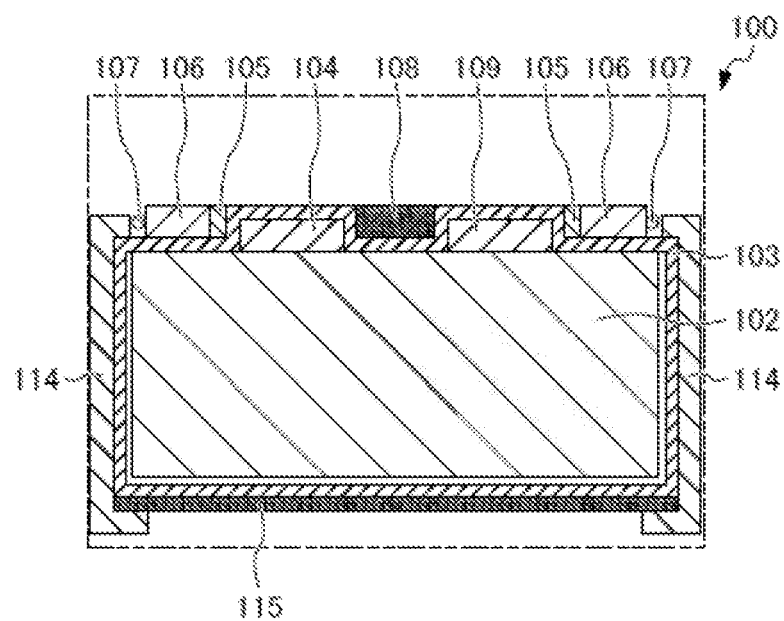

For example, in the solid-state battery module according to the embodiment of the present invention shown in FIG. 5, the arrangement direction of the solid-state batteries (defined herein as a "predetermined direction") aligns with a direction substantially perpendicular to the top cover 113 and the lower plate 115.

However, in the present invention, the arrangement direction is not limited to this direction.

The solid-state batteries may be stacked so as to be substantially parallel to the top cover 113 and the lower plate 115.

When the solid-state batteries are arranged substantially parallel to the top cover 113 and the lower plate 115, a module having a large footprint can be achieved, and thus an improvement of the energy density of the module can be achieved along with an improvement of an electrode filling rate.

Gap

The solid-state battery module according to the embodiment of the present invention is comprised of the solid-state batteries according to the embodiment of the present invention, and a gap is formed between the adjacent solid-state batteries by the pressing portion of the solid-state batteries arranged so as to be substantially parallel to a predetermined direction.

In the battery module 100 shown in FIG. 5(a), which is an embodiment of the solid-state battery module according to the present invention, a plurality of the solid-state batteries according to the embodiment of the present invention as shown in FIG. 1 are included.

As shown in FIG. 5(a), in the battery module 100, the plurality of batteries 101 are arranged so as to be substantially parallel to the predetermined direction, and the gap 111 is formed between the adjacent batteries 101 by the pressing portion 112 present in the battery case 103 of the battery 101.

At least one selected from the group consisting of air, water, a heat transfer material, a heater and the like for controlling the cell temperature, an electrically insulating material, or an electrically conductive material for making the module function, a cushioning material, a battery case fixing member and the like is preferably present in the gap formed. The gap formed thus can impart heat dissipation together with insulating properties.

In the case where the solid-state battery module is formed using the solid-state battery according to the embodiment of the present invention, the gap formed by adjacent solid-state batteries imparts heat dissipation.

With regard to the battery module 100, which is an embodiment of the present invention, either a thermally conductive material such as a silicon compound or cooling water is not disposed on the bottom face of the battery module 100 (i.e., the surface on which the lower plate 115 resides). However, in the case where acceleration of dissipation of heat from the stack of the batteries 101 and coding thereof are necessary, the heat conductive material and/or cooling water may be disposed as required.

Module Component

The module component constituting the solid-state battery module of the present invention is not particularly limited, and it may be any component required for a normal battery module.

For example, the module component is exemplified by a bus bar, a thermistor, a harness, a voltage defection line, a battery case fixing member, a cell voltage and temperature monitoring unit and the like, and in the present invention, the module component may be at least one selected from the group consisting of those listed above.

Arrangement of Module Component

In the case where the solid-state battery according to the present invention is configured such that the battery case has an outer dimension substantially identical to the outer dimension of the solid-state battery cell and includes the recess, the module component is preferably arranged in the recess of the battery case.

The arrangement of the module component in the recess makes it possible to reduce the volume of the entire solid-state battery module, and consequently to improve the energy density of the solid-state battery module.

Further, since there is no residual space in the battery case, the displacement, peeling or the like of the battery cell due to vibration or the like can also be suppressed.

Referring to the battery module 100, which is an embodiment of the present invention, the outer shape of the battery case 103 conforms to the outer shape of the battery cell 102, and the recess is formed in the battery case 103 between the convex portion for housing the positive electrode tab 104 and the convex portion for housing the negative electrode tab 109, as shown in FIG. 5(b).

In other words, the upper face of the battery cell 102 has a shape in which the recess is present in the region corresponding to the residual space in the conventional battery.

In the battery module 100 shown in FIG. 5(b), the thermistor 108, which is a module component, is disposed in the recess formed between the convex portion for housing the positive electrode tab 104 and the convex portion for housing the negative electrode tab 109.

Further, the two terminals 105 are arranged, with one of the terminals 105 being electrically connected to the convex portion for housing the positive electrode tab 104 and the other to the convex portion for housing the negative electrode tab 109, and other module components, i.e., the bus bar 106, and the voltage detection line 107 are arranged so as to line up with the terminals 105.

Applications of Solid-State Battery Modules

The solid-state battery module of the present invention can be used in various apparatuses.

The solid-state battery module of the present invention has a small volume, and high energy density, and is unlikely to cause terminal displacement or the like due to vibration.

Therefore, the solid-state battery module of the present invention can be suitably used, for example, as a power source for electric vehicles and hybrid vehicles, and the like, as well as in portable devices.

EXPLANATION OF REFERENCE NUMERALS 100, 200 battery module
101, 201 battery
102, 202 battery cell
103, 203 battery case
104, 204 positive electrode tab
105, 205 terminal
106, 206 bus bar
107, 207 voltage detection line
108, 208 thermistor
109, 209 negative electrode tab
110, 210 module component
111 gap
112 pressing portion
113, 213 top cover
114, 214 binding bar
115, 215 lower plate
116 fin
120 expansion material
216 separator
217 end plate
218 thermally conductive material
219 cooling water

The invention claimed is:

1. A solid-state battery, comprising a solid-state battery cell, and a battery case for accommodating the solid-state battery cell, wherein
the solid-state battery cell is a stack comprising a positive electrode, a negative electrode, and a solid electrolyte present between the positive electrode and the negative electrode,
the battery case comprises a pressing portion that applies surface pressure to the solid-state battery cell, on a face extending substantially perpendicular to a stacking direction of the stack,
a heat sink is disposed in the pressing portion,
the solid-state battery comprises an expansion material between the solid-state battery cell and the battery case, and
the expansion material expands in volume by water absorption or a chemical reaction.

2. The solid-state battery according to claim 1, wherein the pressing portion is provided only on one face of the battery case.

3. The solid-state battery according to claim 1, wherein the pressing portion is provided on a set of opposing faces of the battery case.

4. The solid-state battery according to claim 1, wherein the heat sink is a fin or an uneven structure.

5. The solid-state battery according to claim 1, wherein the battery case is made of metal.

6. A solid-state battery module comprising a plurality of the solid-state batteries according to claim 1, and a module component, wherein the plurality of solid-state batteries are arranged so as to be substantially parallel to a predetermined direction, and a gap is formed between the adjacent solid-state batteries by the pressing portion.

7. The solid-state battery module according to claim 6, wherein at least one selected from the group consisting of air, water, a heat transfer material, a heater and the like, and an electrically insulating material or an electrically conductive material, a cushioning material and a battery case fixing member and the like is present in the gap.

8. The solid-state battery module according to claim 6, wherein an outer dimension of the battery case is identical to an outer dimension of the solid-state battery cell,
the battery case comprises a recess, and
the module component is disposed in the recess.

9. The solid-state battery module according to claim 6, wherein the module component is at least one selected from the group consisting of a bus bar, a thermistor, a harness, a voltage detection line, a battery case fixing member, and a cell voltage and temperature monitoring unit.

10. The solid-state battery module according to claim 6, wherein
the solid-state battery cell comprises a positive electrode tab connected to the positive electrode, and a negative electrode tab connected to the negative electrode, the battery case comprises at least one convex portion, and the positive electrode tab end the negative electrode tab are housed in the convex portion.

11. The solid-state battery module according to claim 6, wherein the battery case comprises at least two convex portions, and a positive electrode tab connected to the positive electrode and a negative electrode tab connected to the negative electrode are each housed in a different convex portion.

12. The solid-state battery module according to claim 11, wherein the convex portion for housing the positive electrode tab and the convex portion for housing the negative electrode tab are provided on same face in the battery case.

13. The solid-state battery module according to claim 11, wherein the convex portion for housing the positive electrode tab and the convex portion for housing the negative electrode tab are provided on different faces in the battery case.

14. An apparatus comprising the solid-state battery module according to claim 6.

* * * * *